US010587997B2

(12) United States Patent
Dowlatkhah et al.

(10) Patent No.: US 10,587,997 B2
(45) Date of Patent: Mar. 10, 2020

(54) FACILITATING WIRELESS MACHINE TO MACHINE COMMUNICATION SOLUTIONS IN 5G OR OTHER NEXT GENERATION NETWORKS

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/828,738

(22) Filed: Dec. 1, 2017

(65) Prior Publication Data
US 2019/0174251 A1    Jun. 6, 2019

(51) Int. Cl.
*H04W 4/00*    (2018.01)
*H04W 4/70*    (2018.01)
(Continued)

(52) U.S. Cl.
CPC ............ *H04W 4/70* (2018.02); *H04L 47/125* (2013.01); *H04L 67/04* (2013.01); *H04W 76/14* (2018.02); *H04L 67/1006* (2013.01)

(58) Field of Classification Search
CPC ....... H04W 4/70; H04W 76/14; H04W 52/02; H04L 47/125; H04L 67/04; H04L 67/1006
See application file for complete search history.

(56) References Cited

U.S. PATENT DOCUMENTS 9,281,979 B2    3/2016   Maltsev et al.
9,548,542 B2    1/2017   Ling
(Continued)

OTHER PUBLICATIONS

Qiao, et al., "Enabling Device-to-Device Communications in Millimeter-Wave 5G Cellular Networks," IEEE Communications Magazine, Jan. 2015, pp. 209-215, vol. 53, No. 1, IEEE, 7 pages.
(Continued)

*Primary Examiner* — Abdelnabi O Musa
(74) *Attorney, Agent, or Firm* — Amin, Turocy & Watson, LLP

(57) ABSTRACT

Facilitating machine to machine communication solutions is provided herein. A system can comprise a processor and a memory that stores executable instructions that, when executed by the processor, facilitate performance of operations that can comprise establishing a first communication link between a first communication device associated with a first data center rack of a data center and a second communication device of a central controller device of the data center. The operations can also comprise establishing a second communication link between the first communication device and a third communication device associated with a second data center rack of the data center. Further, the operations can comprise establishing a third communication link between the second communication device and the third communication device. The first communication device, the second communication device, and the third communication device can be configured to communicate using a millimeter wave high speed wireless communication protocol.

20 Claims, 10 Drawing Sheets

(51) Int. Cl.
*H04L 29/08* (2006.01)
*H04L 12/803* (2013.01)
*H04W 76/14* (2018.01)

(56) References Cited

U.S. PATENT DOCUMENTS

| | | | |
|---|---|---|---|
| 9,661,515 B2 | 5/2017 | Lord et al. | |
| 9,674,116 B2 | 6/2017 | Dress | |
| 2014/0233460 A1* | 8/2014 | Pettus | H04Q 1/15 370/328 |
| 2014/0375528 A1* | 12/2014 | Ling | H01Q 15/02 343/912 |
| 2015/0080039 A1* | 3/2015 | Ling | H04W 52/02 455/500 |
| 2015/0281064 A1* | 10/2015 | Sanduleanu | H04L 47/50 370/310 |
| 2016/0021549 A1* | 1/2016 | Subramanian | H04W 16/28 370/329 |
| 2016/0269127 A1 | 9/2016 | Ghuman | |
| 2017/0012340 A1* | 1/2017 | Chen | H01Q 1/2258 |
| 2017/0125913 A1 | 5/2017 | Ling | |
| 2017/0222863 A1 | 8/2017 | Franca-Neto | |
| 2018/0351652 A1* | 12/2018 | Ashrafi | H04B 10/616 |

OTHER PUBLICATIONS

Pi, et al., "Millimeter-wave Gbps Broadband Evolution towards 5G: Fixed Access and Backhaul," IEEE Communications Magazine, 2016, pp. 138-144, vol. 54, No. 4, IEEE, 6 pages.

* cited by examiner

US 10,587,997 B2

FACILITATING WIRELESS MACHINE TO MACHINE COMMUNICATION SOLUTIONS IN 5G OR OTHER NEXT GENERATION NETWORKS

TECHNICAL FIELD

The subject disclosure relates generally to machine to machine communications, and for example, to facilitating machine to machine communication solutions in 5G or other next generation networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
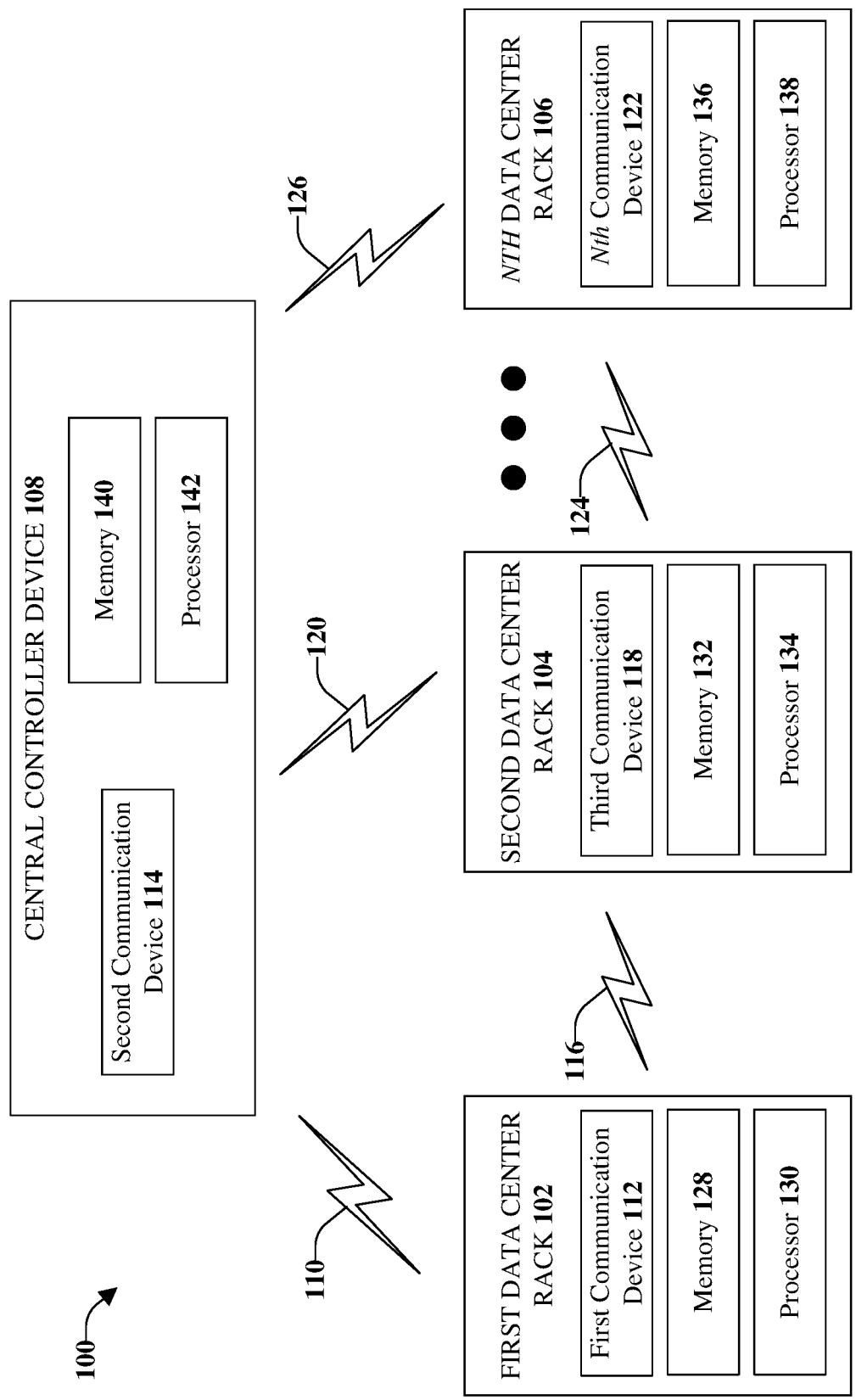
FIG. 1 illustrates an example, non-limiting, system for facilitating machine to machine communication solutions in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Discussed herein are various aspects that relate to facilitating machine to machine communication solutions in 5G or other next generation networks. For example, the various aspects are related to utilizing machine to machine (M2M) multi gigabit rates wireless communication among, for example, central office (CO) or data center (DC) racks by leveraging 5G Millimeter wave (mmWave) small cell and Software Defining Network (SDN) control capability to decrease a number of physical cable connections and to increase communication flexibility among data center racks and related equipment.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or LTE, or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

In one embodiment, described herein is a system that comprises a processor and a memory that stores executable instructions that, when executed by the processor, facilitate performance of operations. The operations can comprise establishing a first communication link between a first communication device associated with a first data center rack of a data center and a second communication device of a central controller device of the data center. The first communication device and the second communication device can be configured to communicate using a millimeter wave high speed wireless communication protocol. The operations can also comprise establishing a second communication link between the first communication device and a third communication device associated with a second data center rack of the data center. The third communication device can be configured to communicate using the millimeter wave high speed wireless communication protocol. Further, the operations can comprise establishing a third communication link between the second communication device and the third communication device.

According to an aspect, the first communication device can perform a backhaul function that facilitates a first transmission of data via the first communication link. Further to this example, the first communication device can perform an access function that facilitates a second transmission of data via the second communication link.

In accordance with some aspects, the second communication link can comprise a wireless inter-rack communication within the data center. According to some aspects, the second communication device can perform a backhaul function and an access function that enable wireless bidirectional transmit and receive data communication for control and management of the first data center rack and at least the second data center rack.

In some aspects, the operations can comprise establishing an inter-rack network that comprises the first data center rack, the second data center rack, and other data center racks of the data center other than the first data center rack and the second data center rack. Further to these aspects, the operations can comprise load balancing network traffic that has been received at the data center to distribute the network traffic substantially uniformly between the first data center rack, the second data center rack, and the other data center racks.

According to some aspects, the millimeter wave high speed wireless communication protocol is a 5G millimeter wave high speed wireless communication protocol. According to these aspects, the operations can further comprise performing a discovery function based on a first determination that the second communication link between the first communication device and the third communication device is no longer established. Further, the operations can comprise facilitating establishment of a fourth communication link between the second communication device and a fourth communication device associated with a third data center of the data center based on a second determination that a communication with the first communication device is no longer currently possible. The fourth communication device can be configured to communicate using the 5G millimeter wave high speed wireless communication protocol.

According to some aspects, the operations can further comprise, in response to a change in a bandwidth distribution, changing a radio resource allocation for an inter-rack communication link between the first data center rack and the second data center rack. Further to these aspects, the operations can comprise establishing multiple simultaneous paths for the inter-rack communication link. The multiple simultaneous paths can implement robust communication links and an increased bandwidth as compared to a single inter-rack communication link between the first data center rack and the second data center rack.

In additional or alternative aspects, the operations can comprise, in response to a change in a bandwidth distribution, changing a radio resource allocation for a self-backhauling communication link of a communication channel between the first communication device and the central controller device. Further to these aspects, the operations can comprise establishing multiple simultaneous paths for the self-backhauling communication link. The multiple simultaneous paths can implement robust communication links and an increased bandwidth as compared to a single self-backhauling communication link between the first data center rack and the central controller device.

In accordance with some aspects, the first communication device, the second communication device, and the third communication device can be implemented within the data center to decrease a number of physical cable connections within the data center.

Another embodiment is a method that can comprise facilitating, by a controller device of a wireless network, a first establishment of a first wireless communication link with a first cloud data center rack. The first wireless communication link can be established between a first millimeter wave transport device of the controller device and a second millimeter wave transport device of the first cloud data center rack. The method can also comprise facilitating, by the controller device, a second establishment of a second wireless communication link with a second cloud data center rack. The second wireless communication link can be established between the first millimeter wave transport device and a third millimeter wave transport device of the second cloud data center rack. Further, the method can comprise facilitating, by the controller device, a third establishment of a third wireless communication link between the first cloud data center rack and the second cloud data center rack. The third wireless communication link can be established between the second millimeter wave transport device and the third millimeter wave transport device.

In an example, the method can comprise configuring, by the controller device, respective multiple-input-multiple-output and beam-forming configurations for the first wireless communication link, the second wireless communication link, and the third wireless communication link. According to another example, the method can comprise configuring, by the controller device, respective interference mitigation configurations for the first cloud data center rack and the second cloud data center rack.

In accordance with another example, the method can comprise re-directing, by the controller device, network traffic from the first cloud data center rack to the second cloud data center rack. The network traffic re-direction can be based on a determination that the network traffic is not distributed evenly between the first cloud data center rack and the second cloud data center rack.

In another example, the method can comprise modifying, by the controller device, a radio resources allocation for an inter-rack communication link between the first cloud data center rack and the second cloud data center rack based on a bandwidth distribution.

According to yet another embodiment, described herein is a machine-readable storage medium comprising executable instructions that, when executed by a processor, facilitate performance of operations. The operations can comprise facilitating an inter-rack communication between a first rack device and a second rack device. The first rack device and the second rack device can be rack devices of a data center. The inter-rack communication can be established between a first wireless 5G millimeter wave transport device of the first rack device and a second wireless 5G millimeter wave transport device of the second rack device. The operations can also comprise establishing a first backhaul link between the first wireless 5G millimeter wave transport device and a third wireless 5G millimeter wave transport device of a central device of the data center. Further, the operations can comprise establishing a second backhaul link between the second wireless 5G millimeter wave transport device and the third wireless 5G millimeter wave transport device.

In an example, the operations can also comprise maintaining a load condition data structure that comprises a first load condition for the first rack device and a second load condition for the second rack device. The first load condition can represent a first amount of network traffic processed by the first rack device and the second load condition can represent a second amount of network traffic processed by the second rack device. Further to this example, the operations can comprise moving a portion of the first amount of network traffic from the first rack device to the second rack device based on a determination that the first amount of network traffic is larger than the second amount of network traffic by at least a threshold traffic amount.

According to an example, the operations can comprise establishing multiple simultaneous paths for the inter-rack communication between the first rack device and the second rack device. The multiple simultaneous paths can comprise robust communication links and an increased bandwidth as compared to a single inter-rack communication link between the first rack device and the second rack device.

Referring initially to FIG. 1, illustrated is an example, non-limiting, system 100 for facilitating machine-to-machine communication solutions in accordance with one or more embodiments described herein. The various aspects discussed herein can facilitate improved coverage and machine to machine communication solutions in a wireless communications system.

The various aspects discussed herein can be utilized for rack to rack communication in a data center and/or a central office. Rack-to-rack link communication and management signaling in a data center and/or central office is increasing and has resulted in extensive additional physical cabling between the racks and control management device(s). In addition, adding new capacity in a rack or changing the communication links among racks requires manual operation to physically re-cable the racks.

Millimeter wave (mmW) tiny small cell cellular systems can utilize a 5G technology. The mmW can use time-frequency-spatial layers as a dynamic resource grid, instead of time-frequency only as a resource grid. The addition of the spatial layer as a multi-user resource is a component of 5G that can be enabled with techniques such as Full-Dimension Multiple-Input Multiple-Output (FD-MIMO) or massive MIMO. The introduction of this spatial layer as a multi-user resource can allow an mmW transporter (TP) to concurrently and/or simultaneously communicate with a user equipment (UE) on the access and another TP on the backhaul utilizing the same channel.

High propagation attenuation at these higher bands (e.g., 60 GHz) can provide a set of short-range applications with dense frequency reuse patterns with multiple gigabit-per-second data rates. Higher frequencies can lead to smaller sizes of Radio Frequency (RF) components including antennas. At mmW frequencies, not only are the antennas very small, but the antennas can be directional with high antenna gain, which can be utilized for indoor rack to rack communication, as discussed herein. Furthermore, interference can be eliminated and leveraged since an SDN controller can manage the antenna directions and beam forming parameters based on real time measurements.

The various aspects discussed herein can leverage 5G mmW for inter-rack communications between TPs and can implement the use of mmW self-backhauling for the communication between one or more racks and the SDN controller. Accordingly, the various aspects can provide the control and management functions for the racks located in a central office and/or a data center. Further the various aspects can enable wireless based central offices and/or data centers and can remove the physical cabling between the racks and the physical cabling between the racks and the SDN controller.

The system 100 can comprise a first data center rack 102, a second data center rack 104, through an Nth data center rack 106, where N is an integer equal to or larger than zero. For example, the system 100 can comprise two or more data center racks. A data center rack (central office rack, cloud data center rack, or simply a "rack") can be defined as many network servers, compute servers, and/or storage servers and components (such as power supplies, fans, fabric, and so on) that can be plugged into the racks.

The system 100 can also comprise a central controller device 108. In accordance with an implementation, the central controller device 108 can be a Software Defining Network (SDN) controller. The central controller device 108 can control various parameters of the system 100. Such parameters include, but are not limited to: frequency, antenna parameters, turning access points on/off, receiving channel conditions (e.g., noise level), and generating related alarms and errors.

Respective communication devices can be associated with the data center racks (e.g., the first data center rack 102, the second data center rack 104, the Nth data center rack 106) and the central controller device 108 to allow respective wireless communication links therebetween. For example, a first communication link 110 can be established between a first communication device 112 associated with the first data center rack 102 and a second communication device 114 associated with the central controller device 108. Further to this example, a second communication link 116 can be established between the first communication device 112 and a third communication device 118 associated with the second data center rack 104. Further, a third communication link 120 can be established between the second communication device 114 and the third communication device 118. Additionally, respective communication links (represented by a fourth communication link 124) can be established between an Nth communication device 122 associated with the Nth data center rack 106 and the first communication device 112 and/or the third communication device 118. It is noted that although only a single communication link (e.g., the fourth communication link 124) is illustrated, separate communication links can be established between the Nth communication device 122 and the first communication device 112 and/or the third communication device 118, and other communication devices. Further, at least a fifth communication link 126 can be established between the Nth communication device 122 and the second communication device 114.

According to some implementations, the communication devices (e.g., the first communication device 112, the second communication device 114, the third communication device 118, and the Nth communication device 122) can be configured to communicate using a millimeter wave high speed wireless communication protocol. According to an implementation, the communication protocol can be a 5G millimeter wave high speed wireless communication protocol.

In accordance with some implementations, the first communication device 112 can perform a backhaul function that can facilitate a first transmission of data via the first communication link 110. Further to these implementations, the first communication device 112 can perform an access function that can facilitate respective transmissions of data via the second communication link 116 and/or the fourth communication link 124. In some implementations, the second communication link 116 and/or the fourth communication link 124 can comprise respective wireless inter-rack communications within the data center (e.g., between the first data center rack 102 and the second data center rack 104 and/or the Nth data center rack 106).

The third communication device 118 can perform a backhaul function that can facilitate a transmission of data via the third communication link 120. Further, the third communication device 118 can perform an access function that can facilitate respective transmissions of data via the second communication link 116 and/or the fourth communication link 124. In some implementations, the second communication link 116 and/or the fourth communication link 124 can comprise respective wireless inter-rack communications within the data center (e.g., between the second data center rack 104 and the first data center rack 102 and/or the Nth data center rack 106).

In accordance with another implementation, the Nth communication device 122 can perform a backhaul function that can facilitate transmission of data via the fifth communication link 126. Further, the Nth communication device 122 can perform an access function that can facilitate inter-rack communication over the fourth communication link 124 (e.g., between the Nth data center rack 106 and the first data center rack 102 and/or the second data center rack 104).

According to some implementations, the second communication device 114 can perform a backhaul function and an access function that can enable wireless bi-directional transmit and receive data communication for control and management of the first data center rack 102, the second data center rack 104, and the Nth data center rack 106. For example, the second communication device 114 can perform a backhaul function that can facilitate respective transmissions of data via the first communication link 110, the third communication link 120, and/or the fifth communication link 126.

Based on the wireless communication established between the data center racks and the central controller device as discussed herein, various benefits can be achieved. For example, the various aspects can provide more flexible and dynamic rack-to-rack communication for indoor cloud data centers (including central offices). Further, self-discovery of newly added (e.g., rolled in racks, newly installed racks) for autonomous operation can be performed. In addition, the various aspects can provide reductions in the amount of physical cabling and/or the extensive operational complexity of input/output (I/O). Further, efficient communication through multicast capabilities of wireless networks can be provided. The various aspects can also facilitate coordination gains among racks for load balancing and interference mitigation, out of band back up platform for high availability and fault tolerance, and/or out of band operational command and control and scheduling of rack services. Further, the disclosed aspects can provide dynamic configuration using a software defined approach (e.g., using an SDN controller), can reduce power consumption, can provide multiple simultaneous paths for inter-rack and/or the TP-SDN controller links, which can provide robust communication links with higher bandwidth.

According to various implementations, the first communication device 112, the second communication device 114, the third communication device 118, and the Nth communication device 122 can be implemented within the data center to decrease a number of physical cable connections within the data center. For example, the communications between the communication devices can be performed wirelessly through use of a millimeter wave high speed wireless communication protocol. According to some implementations, the wireless communication protocol can be a 5G millimeter wave high speed wireless communication protocol.

As illustrated, the data center racks and the central controller device 108 can comprise respective memories and respective processors. For example, the first data center rack 102 can comprise one or more memories 128 and one or more processors 130. The second data center rack 104 can comprise one or more memories 132 and one or more processors 134. Further, the Nth data center rack 106 can comprise one or more memories 136 and one or more processors 138. In addition, the central controller device 108 can comprise one or more memories 140 and one or more processors 142. The respective one or more memories 128, 132, 136, and 140 can be operatively coupled to the respective one or more processors 130, 134, 138, and 142.

The respective one or more memories 128, 132, 136, and 140 can store protocols associated with facilitating machine to machine wireless communication solutions as discussed herein. Further, the respective one or more memories 128, 132, 136, and 140 can facilitate action to control communication between the first data center rack 102, the second data center rack 104, the Nth data center rack 106, and the central controller device 108, such that the system 100 can employ stored protocols and/or algorithms to achieve improved communications and machine to machine communication solutions in a wireless network as described herein.

It should be appreciated that data store components (e.g., memories) described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 130, 134, 138, and 142 can facilitate machine to machine communications and load balancing in a communication network. The processors 130, 134, 138, and 142 can be processors dedicated to analyzing and/or generating information received, processors that control one or more components of the system 100, and/or processors that both analyze and generate information received and control one or more components of the system 100.

Figure 2:
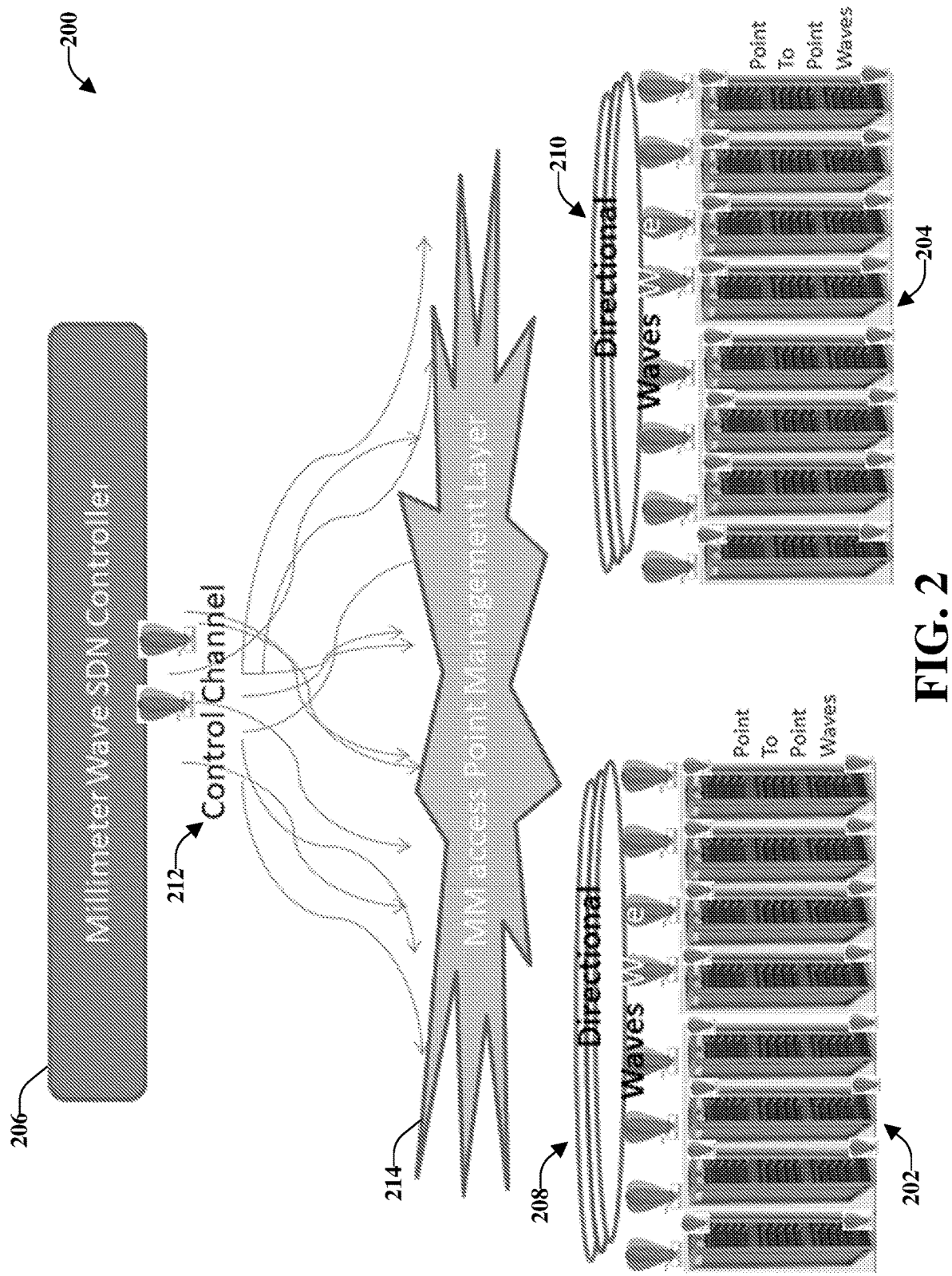
FIG. 2 illustrates an example, non-limiting, system for millimeter wave central office rack to rack wireless communication in accordance with one or more embodiments described herein.

FIG. 2 illustrates an example, non-limiting, system 200 for millimeter wave central office rack to rack wireless communication in accordance with one or more embodiments described herein. Repetitive description of like elements employed in other embodiments described herein is omitted for sake of brevity.

The system 200 can comprise one or more of the components and/or functionality of the system 100 and vice versa. As illustrated multiple control racks can be included in a central office. For example, a first set of control racks 202 and a second set of control racks 204 (e.g., the first data center rack 102, the second data center rack 104, the Nth data center rack 106) are illustrated. Also included in the system 200 can be a SDN controller 206 (e.g., the central controller device 108). For example, the SDN controller 206 can be a millimeter wave SDN controller, which can implement a 5G wireless protocol according to some implementations.

It is noted that although eight control racks are illustrated in the first set of control racks 202 and another eight control racks are illustrated in the second set of control racks 204, the disclosed aspects are not limited to this implementation.

Instead, fewer or more than eight control racks can be included in the sets. Further, although two sets of control racks are illustrated, various implementations can include more than two sets of control racks. In addition, the sets of control racks can include a same number of control racks (e.g., nine control racks in each set), or a different number of control racks (e.g., six control racks in a first set, seven control racks in a second set, and ten control racks in a third set).

According to an implementation, SDN controlled (e.g., controlled by the SDN controller 206 or the central controller device 108) mmWave transporters (TPs) (e.g., the first communication device 112, the third communication device 118, the Nth communication device 122) can be installed on top of the one or more racks. In data centers, physical cables can be located everywhere in order to connect the one or more racks and the SDM controller. As discussed herein, by using mmWave a large amount of (if not all) cabling can be eliminated from the system, which can provide dynamic elasticity for the transmission of data communication as well as the ease of installation and management of the control racks.

As illustrated the first set of control racks 202 can produce a first set of directional waves 208 (e.g., point to point waves) and the second set of control racks 204 can produce a second set of directional waves 210 (e.g., point to point waves). Further, one or more control channels 212 can be transmitted by the SDN controller 206 to the first set of control racks 202 and the second set of control racks 204 via a machine to machine access point management layer 214.

The various aspects provided herein can leverage 5G mmW for wireless based central offices and/or data centers. For example, the various aspects can provide robotic control of rack-to-rack communications end points. Further, dynamic communication practices among closed proximity racks can be facilitated with the disclosed aspects. Further, wireless rack mounted mesh that is adjustable can be formed, which can represent a network or communication web inside the data center/central office. Such communication can be performed with a reduction in the amount of physical cabling and a reduction in the amount of extensive operational complexity of I/O. Efficient communication through multicast capabilities of wireless can also be achieved with the disclosed aspects. Coordination gains among racks for load balancing and interference mitigation can be facilitated through load balancing and dynamically re-directing network traffic among the data center racks to more uniformly distribute the network traffic. Further, an out of band back up platform for high availability and fault tolerance can be facilitated with the disclosed aspects. In addition, out of band operational command and control and scheduling of rack services can be provided. In addition, the various aspects can provide dynamic configuration using a software defined approach, such as through the use of an SDN controller as discussed herein. Reduced power consumption can also be achieved based on the load balancing and/or the wireless communication between the devices. Multiple simultaneous paths for inter-rack as well as the TP-SDN controller links, which provide robust communication links with higher bandwidth are also provided with the disclosed aspects.

Figure 3:
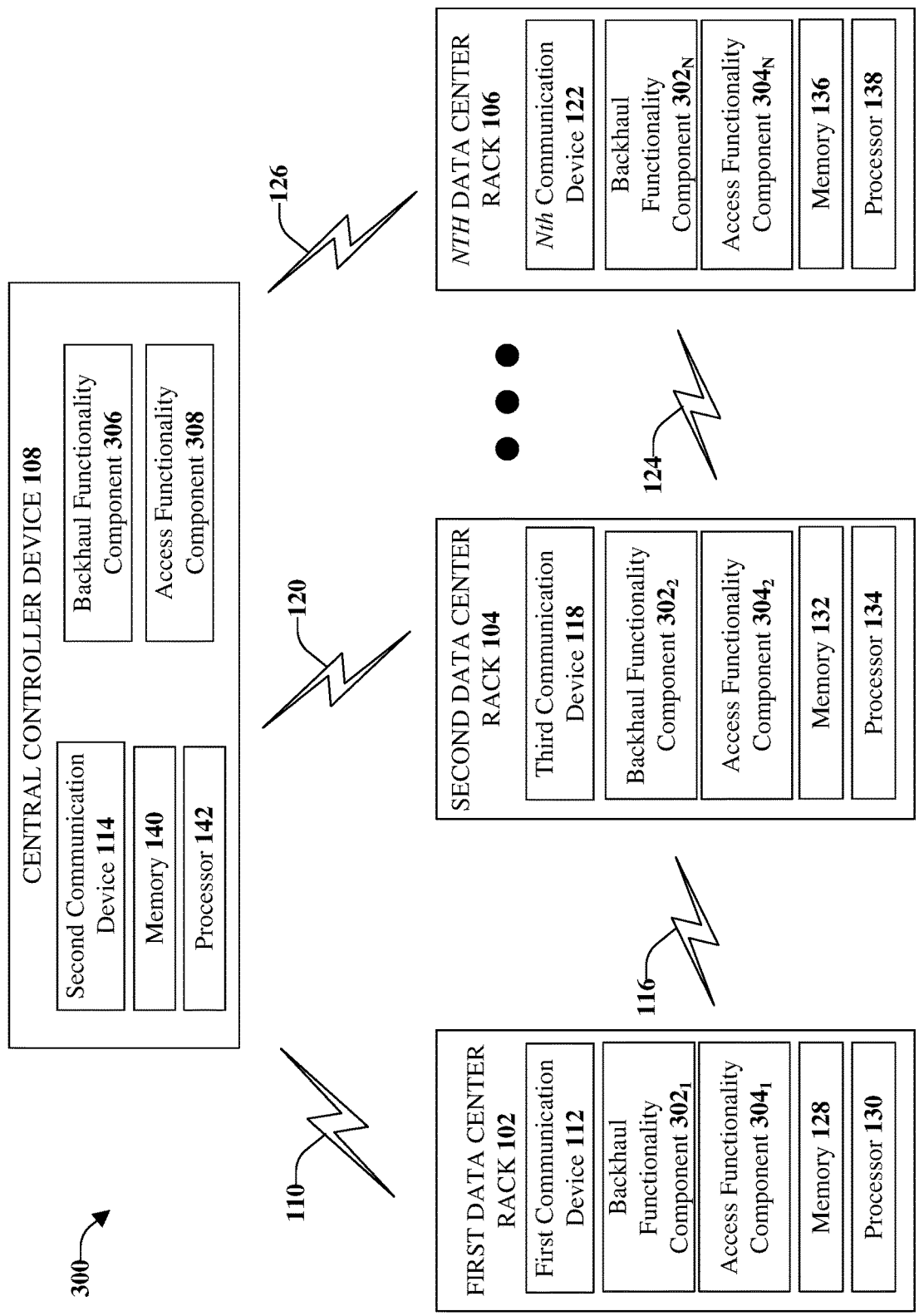
FIG. 3 illustrates an example, non-limiting, system for leveraging a high-speed wireless communication protocol for inter-rack communication in accordance with one or more embodiments described herein.

FIG. 3 illustrates an example, non-limiting, system 300 for leveraging high speed wireless communication for inter-rack communication in accordance with one or more embodiments described herein. Repetitive description of like elements employed in other embodiments described herein is omitted for sake of brevity.

The system 300 can comprise one or more of the components and/or functionality of the system 100, and/or the system 200, and vice versa. The system 300 (as well as other embodiments discussed herein) can leverage a high-speed wireless communication protocol and associated multi-user resource capability to provide the machine to machine communication solutions as discussed herein. According to some implementations, the high-speed wireless communication protocol can be a 5G mmW high speed wireless communication protocol.

In an implementation, the high-speed wireless communication protocol and associated multi-user resource capability can be utilized for inter-rack communication (e.g., communication via the second communication link 116 and/or via the fourth communication link 124). Further to this implementation, the high-speed wireless communication protocol and associated multi-user resource capability can also be utilized for communication between the racks and the SDN controller (e.g., the central controller device 108), such as over the first communication link 110, the third communication link 120, and/or the fifth communication link 126.

As illustrated, the one or more racks (e.g., the data center racks) can implement respective mmW transporters or mmW TP (e.g., the first communication device 112, the third communication device 118, and the Nth communication device 122), on top of the rack. As illustrated the one or more racks can comprise respective backhaul functionality components $302_1$, $302_2$, through $302_N$ that can provide transporter wireless communications over the backhaul. Further, the racks can comprise respective access functionality components $304_1$, $304_2$, and $304_N$, that can provide user equipment (UE) wireless communications. Thus, the respective backhaul functionality components $302_1$, $302_2$, through $302_N$ and the respective access functionality components $304_1$, $304_2$, and $304_N$ can be configured allow bidirectional transmit and receive data communication wirelessly.

In addition, the central controller device 108 (e.g., the SDN controller 206) can implement a mmW TP (e.g., the second communication device 114). The central controller device 108 can also comprise a backhaul functionality component 306 and an access functionality component 308. Accordingly, the central controller device 108 can perform both a transporter function (e.g., via the backhaul functionality component 306) and a user equipment function (e.g., via the access functionality component 308), which can allow bidirectional transmit and receive data communication for control and management wirelessly.

According to some implementations, for the respective backhaul functionality components $302_1$, $302_2$, through $302_N$, the central controller device 108 can configure the radio resource partition and allocation between one or more backhaul functionality components and the other backhaul functionality components of the respective backhaul functionality components $302_1$, $302_2$, through $302_N$ for the inter-rack communications. Further, the central controller device 108 can configure radio resources for the TP self-backhauling for the communication channels between one or more backhaul functionality component and the other backhaul functionality components of the respective backhaul functionality components $302_1$, $302_2$, through $302_N$ and the central controller device 108 (e.g., the SDN controller 206).

Figure 4:
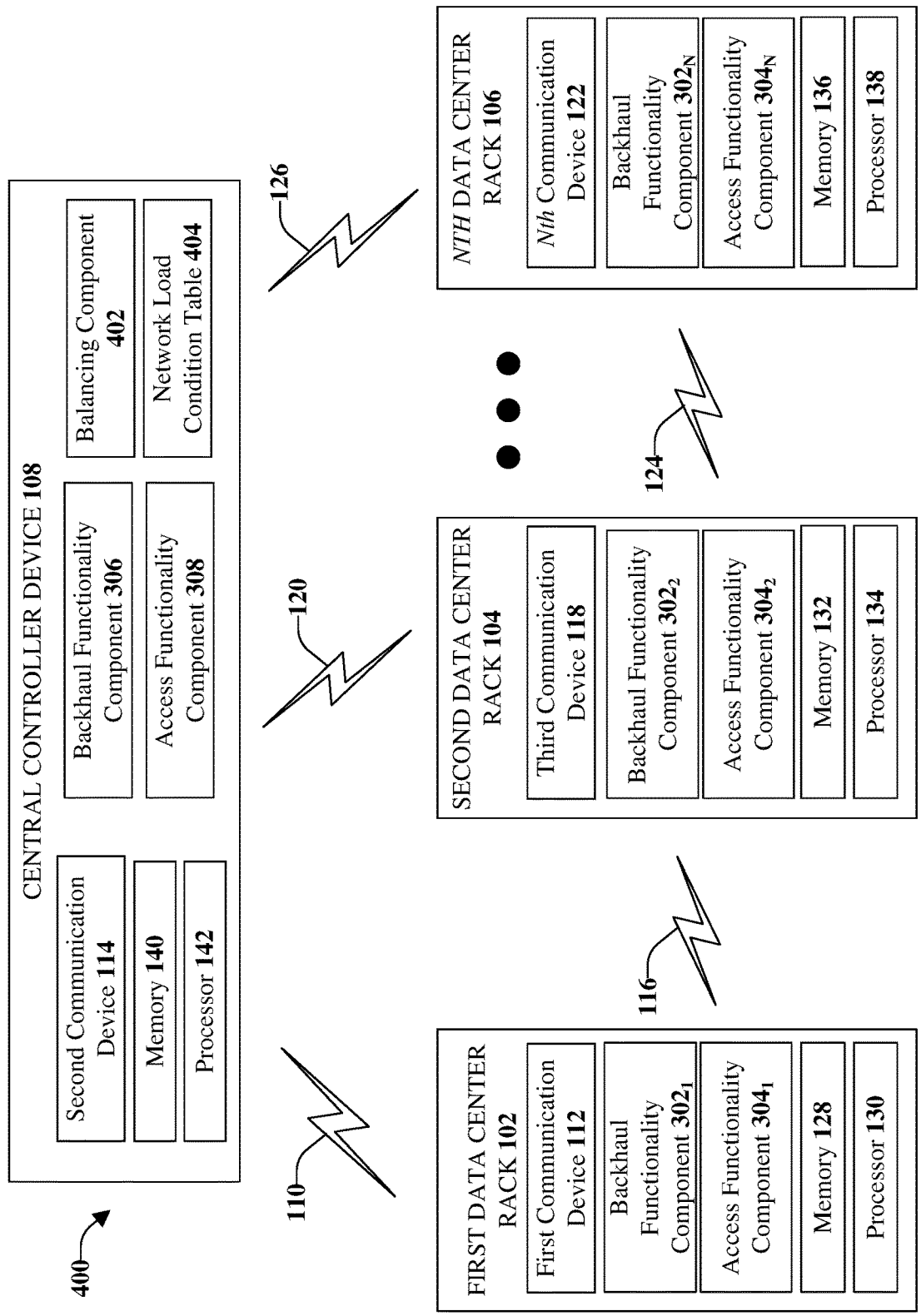
FIG. 4 illustrates an example, non-limiting, system for load balancing network traffic in accordance with one or more embodiments described herein.

FIG. 4 illustrates an example, non-limiting, system 400 for load balancing network traffic in accordance with one or more embodiments described herein. Repetitive description of like elements employed in other embodiments described herein is omitted for sake of brevity.

The system 400 can comprise one or more of the components and/or functionality of the system 100, the system 200, and/or the system 300, and vice versa. As illustrated, an inter-rack network that comprises the first data center rack 102, the second data center rack 104, and other data center racks (e.g., the Nth data center rack 106) of the data center can be established through the respective communication devices (e.g., the first communication device 112, the second communication device 114, the third communication device 118, and the Nth communication device 122).

A balancing component 402 can determine that at least one of the data center racks is handling a disproportionate amount of network traffic. Based on the determination, the balancing component 402 can automatically redistribute network traffic within the data center. For example, the balancing component 402 can load balance network traffic that has been received at the data center to distribute the network traffic substantially uniformly between the first data center rack 102, the second data center rack 104, and the other data center racks (e.g., the Nth data center rack 106). Load balancing the network traffic can provide a reduction in power consumption since data racks are not in an overload condition (e.g., consuming an extra amount of resources to handle the network load).

For example, to determine the amount of network traffic being handled by each data center rack, the central controller device 108 can set up and maintain the inter-rack network and can retain information related to the network traffic load in a network load condition table 404. The network load condition table 404 can be dynamically updated as data center racks are added and/or removed from the system. Accordingly, the scaling of data center racks can be dynamically facilitated as discussed herein.

The central controller device 108 can also configure multiple input multiple output (MIMO) and beam-forming configurations for the one or more communication links (inter-rack or TP-SDN controller link (e.g., the wireless communication links between the central controller device 108 and the one or more data center racks). The central controller device 108 can also facilitate an interference mitigation configuration for each TP (e.g., the first communication device 112, the third communication device 118, the Nth communication device 122) to mitigate and/or reduce interference among the communication links. For example, the central controller device 108 can facilitate movement of respective one or more directional antennas associated with the data center racks. To facilitate the movement, the central controller device 108 can determine a direction in which an antenna should be moved and can wirelessly provide this information to the appropriate data center rack, which can move the one or more antennas accordingly.

The central controller device 108 (e.g., the SDN controller 206) can further dynamically change a radio resource allocation for the inter-rack communication. For example, the central controller device 108 can provide an indication to two or more data center racks as to the radio resources allocated to those data center racks for communication amongst those data center racks. Additionally, or alternatively, the central controller device 108 can dynamically change another radio resource allocation for the self-backhauling for the communication channel between the TPs (e.g., the communication devices of the data center racks) and the SDN controller for each TP based on the bandwidth needs and/or availability.

The central controller device 108 can also establish multiple concurrent (or simultaneous) paths for inter-rack communication. Additionally, or alternatively, the central controller device 108 can establish multiple concurrent (or simultaneous) paths for the self-backhauling link. The multiple paths can provide robust communication links with higher bandwidth.

Figure 5:
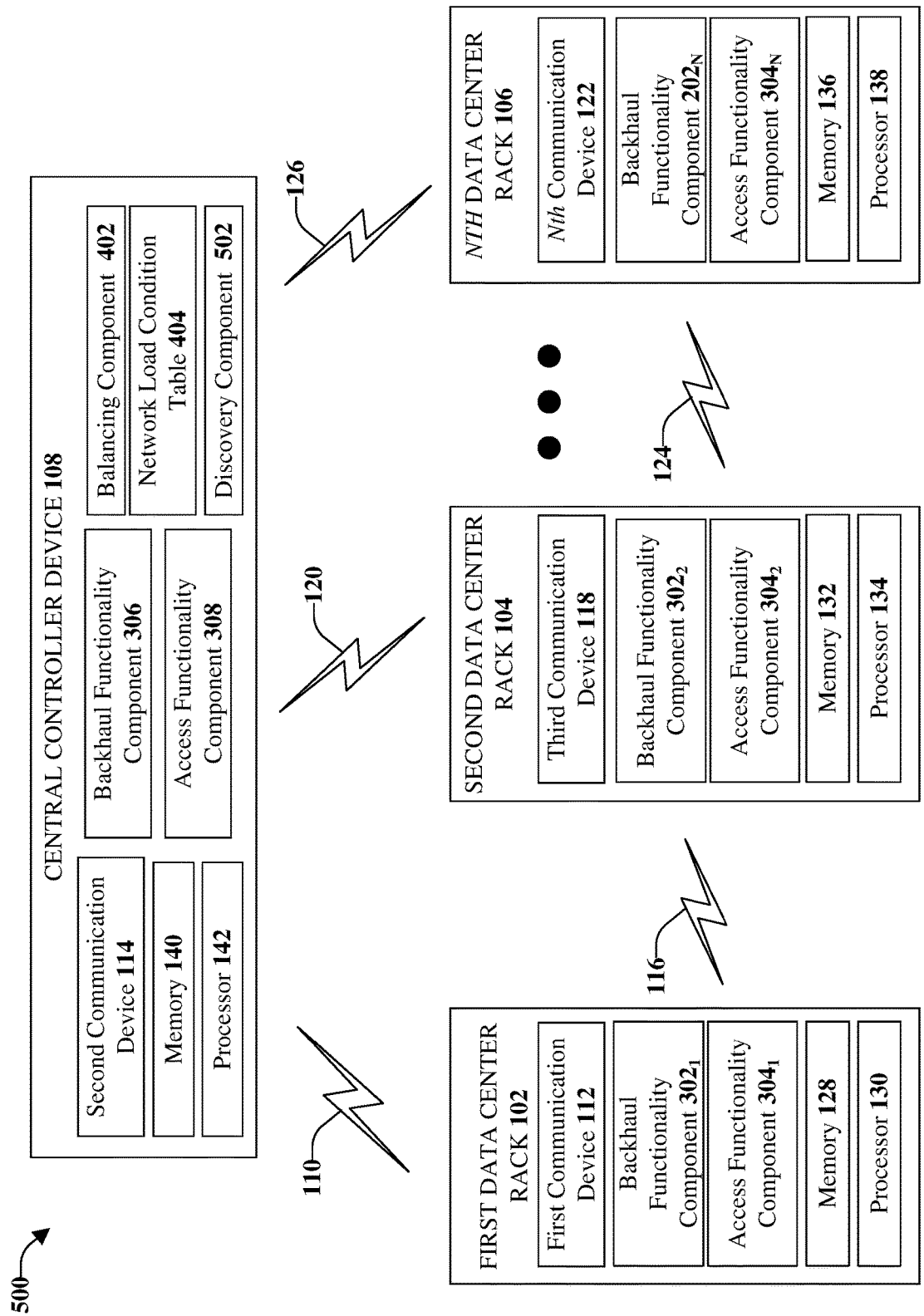
FIG. 5 illustrates an example, non-limiting, system for performing discovery functions to facilitate machine to machine communication solutions in accordance with one or more embodiments described herein.

FIG. 5 illustrates an example, non-limiting, system 500 for performing discovery functions to facilitate machine to machine communication solutions in accordance with one or more embodiments described herein. Repetitive description of like elements employed in other embodiments described herein is omitted for sake of brevity.

The system 500 can comprise one or more of the components and/or functionality of the system 100, the system 200, the system 300, and/or the system 400, and vice versa. The various aspects discussed herein can support a rack on a wheel that allows movable racks that comprise various equipment. In this case, the central controller device 108 (e.g., the SDN controller 206) can comprise a discovery component 502 that can determine the location of each rack and can reconfigure the wireless links associated with the respective communication devices (e.g., TP devices) for the one or more data center racks. According to an implementation, the central controller device 108 can run a script or other data communication that can identify a next point of access for a particular data center rack.

For example, a first data center rack and a second data center rack are in communication. However, the first data center rack becomes unavailable (e.g., an error has occurred, the rack is taken out of commission). Based on detection that the first data center rack is no longer available, the central controller device 108 can, with minimal interruption, wirelessly instruct the second data center rack to begin routing the communication to a third data center rack. The instruction to the second data center rack to discontinue communication with the first data center rack and begin communication with the third data center rack can be performed dynamically with minimal interruption since physical cabling does not need to be manually changed between the data center racks. With the wireless communication among each rack, efficient communication through multicast capabilities of wireless is also possible with the various aspects disclosed herein.

The central controller device 108, which can perform SDN applications, can be responsible for optimization practices such as beam forming adjustments, MIMO functions, and so on. For example, the central controller device 108 can instruct one or more data center racks (or the respective communication devices) to adjust one or more antennas. The central controller device 108 can also control parameters such as, but not limited to, frequency, antenna parameters, turn access points on/off, receive channel conditions (noise level), and related alarms and errors.

Figure 6:
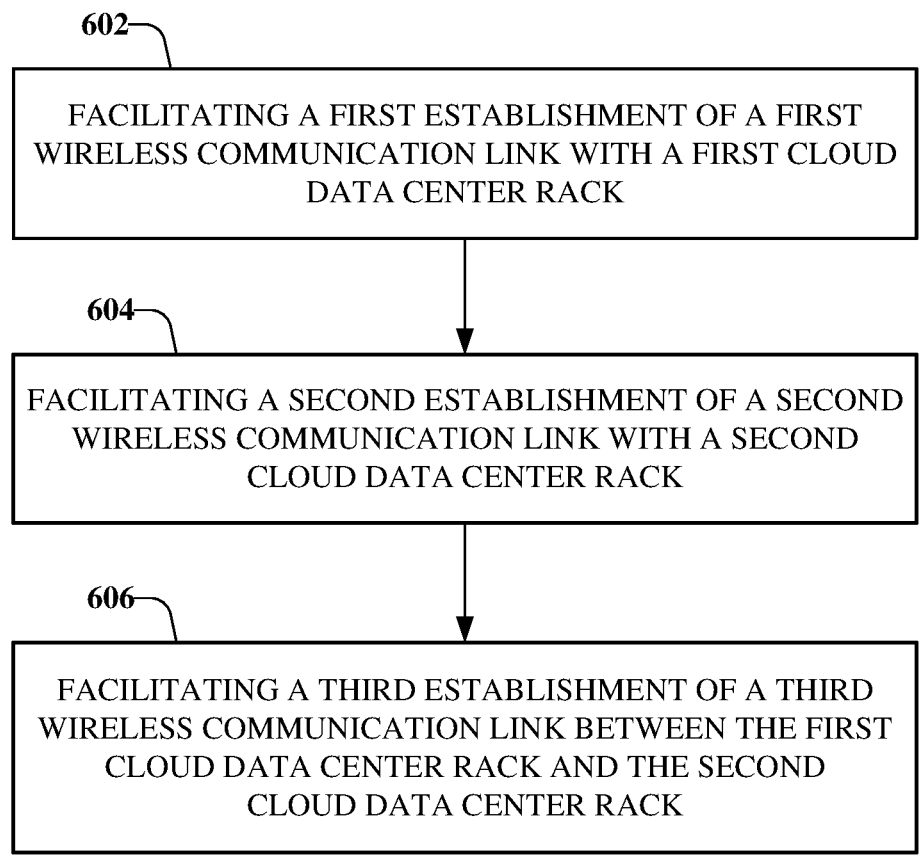
FIG. 6 illustrates an example, non-limiting, method for facilitating machine to machine communication solutions in accordance with one or more embodiments described herein.

FIG. 6 illustrates an example, non-limiting, method 600 for facilitating machine-to-machine communication solutions in accordance with one or more embodiments described herein. The method 600 (as well as other methods discussed herein) can be implemented by a network device of a wireless network, a controller device, and/or an SDN controller, which can comprise respective processors and memories. Alternatively, or additionally, a machine-readable storage medium can comprise executable instructions that, when executed by a processor, facilitate performance of operations for the methods. Repetitive description of like elements employed in other embodiments described herein is omitted for sake of brevity.

The method 600 starts, at 602, when a controller device (e.g., the central controller device 108) of a wireless network, facilitates a first establishment of a first wireless communication link (e.g., the first communication link 110) with a first cloud data center rack (e.g., the first data center rack 102). The first wireless communication link can be established between a first millimeter wave transport device (e.g., the second communication device 114) of the controller device and a second millimeter wave transport device (e.g., the first communication device 112) of the first cloud data center rack.

Further, at 604, the controller device can facilitate a second establishment of a second wireless communication link (e.g., the third communication link 120) with a second cloud data center rack (e.g., the second data center rack 104). The second wireless communication link can be established between the first millimeter wave transport device and a third millimeter wave transport device (e.g., the third communication device 118) of the second cloud data center rack.

In addition, at 606, the controller device can facilitate a third establishment of a third wireless communication link (e.g., the second communication link 116) between the first cloud data center rack and the second cloud data center rack. The third wireless communication link can be established between the second millimeter wave transport device and the third millimeter wave transport device.

According to some implementations, the method 600 can include configuring, by the controller device, respective multiple-input-multiple output and beam-forming configurations for the first wireless communication link, the second wireless communication link, the third wireless communication link, and other wireless communication links. In additional or alternative implementations, the method 600 can include configuring, by the controller device, respective interference mitigation configurations for the first cloud data center rack and the second cloud data center rack.

Figure 7:
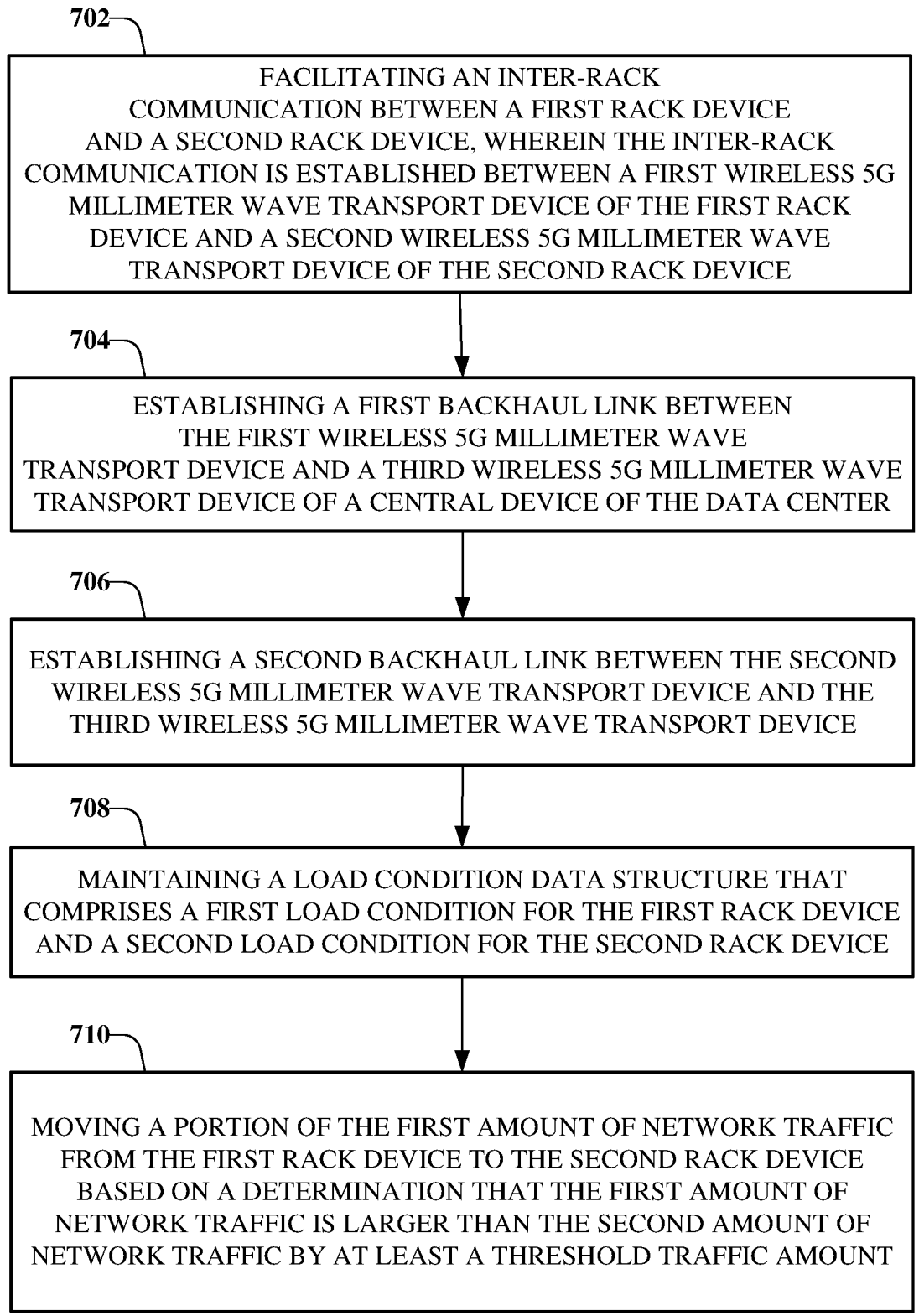
FIG. 7 illustrates an example, non-limiting, method for facilitating load balancing in accordance with one or more embodiments described herein.

FIG. 7 illustrates an example, non-limiting, method 700 for facilitating load balancing in accordance with one or more embodiments described herein. Repetitive description of like elements employed in other embodiments described herein is omitted for sake of brevity.

The method 700 can begin, at 702, with facilitating an inter-rack communication (e.g., the second communication link 116) between a first rack device (e.g., the first data center rack 102) and a second rack device (e.g., the second data center rack 104). The first rack device and the second rack device can be rack devices of a data center. The inter-rack communication can be established between a first wireless 5G millimeter wave transport device (e.g., the first communication device 112) of the first rack device and a second wireless 5G millimeter wave transport device (e.g., the third communication device 118) of the second rack device.

At 704, a first backhaul link (e.g., the first communication link 110) can be established between the first wireless 5G millimeter wave transport device and a third wireless 5G millimeter wave transport device (e.g., the second communication device 114) of a central device (e.g., the central controller device 108) of the data center. Further, at 706, a second backhaul link (e.g., the third communication link 120) can be established between the second wireless 5G millimeter wave transport device and the third wireless 5G millimeter wave transport device.

The method 700 can continue, at 708, with maintaining a load condition data structure (e.g., the network load condition table 404) that can comprise a first load condition for the first rack device and a second load condition for the second rack device. The first load condition can represent a first amount of network traffic processed by the first rack device and the second load condition can represent a second amount of network traffic processed by the second rack device. A determination can be made based on whether the first amount of network traffic and/or the second amount of network traffic is more than a threshold traffic amount. The threshold traffic amount can be determined based on network capacity, traffic conditions, and so on).

Based on a determination that the first amount of network traffic is larger than the second amount of network traffic by at least the threshold traffic amount, at 710, a portion of the first amount of network traffic can be moved from the first rack device to the second rack device. For example, the threshold traffic amount can be utilized to determine that the network traffic is not distributed evenly between the first rack device and the second rack device (or other rack devices). To move the portion of the first amount of network traffic, the portion can be redirected from the first rack device to the second rack device based on a wireless instruction from the central device. Since the instruction to redirect traffic is performed wirelessly, there is no need to physically re-cable the first rack device and/or the second rack device.

According to some implementations, the method 700 can include modifying, by the controller device, a radio resources allocation for an inter-rack communication link between the first rack device and the second rack device based on a bandwidth distribution. In accordance with additional or alternative implementations, the method 700 can include establishing multiple simultaneous paths for the inter-rack communication between the first rack device and the second rack device. The multiple simultaneous paths can comprise robust communication links and an increased bandwidth as compared to a single inter-rack communication link between the first rack device and the second rack device.

Figure 8:
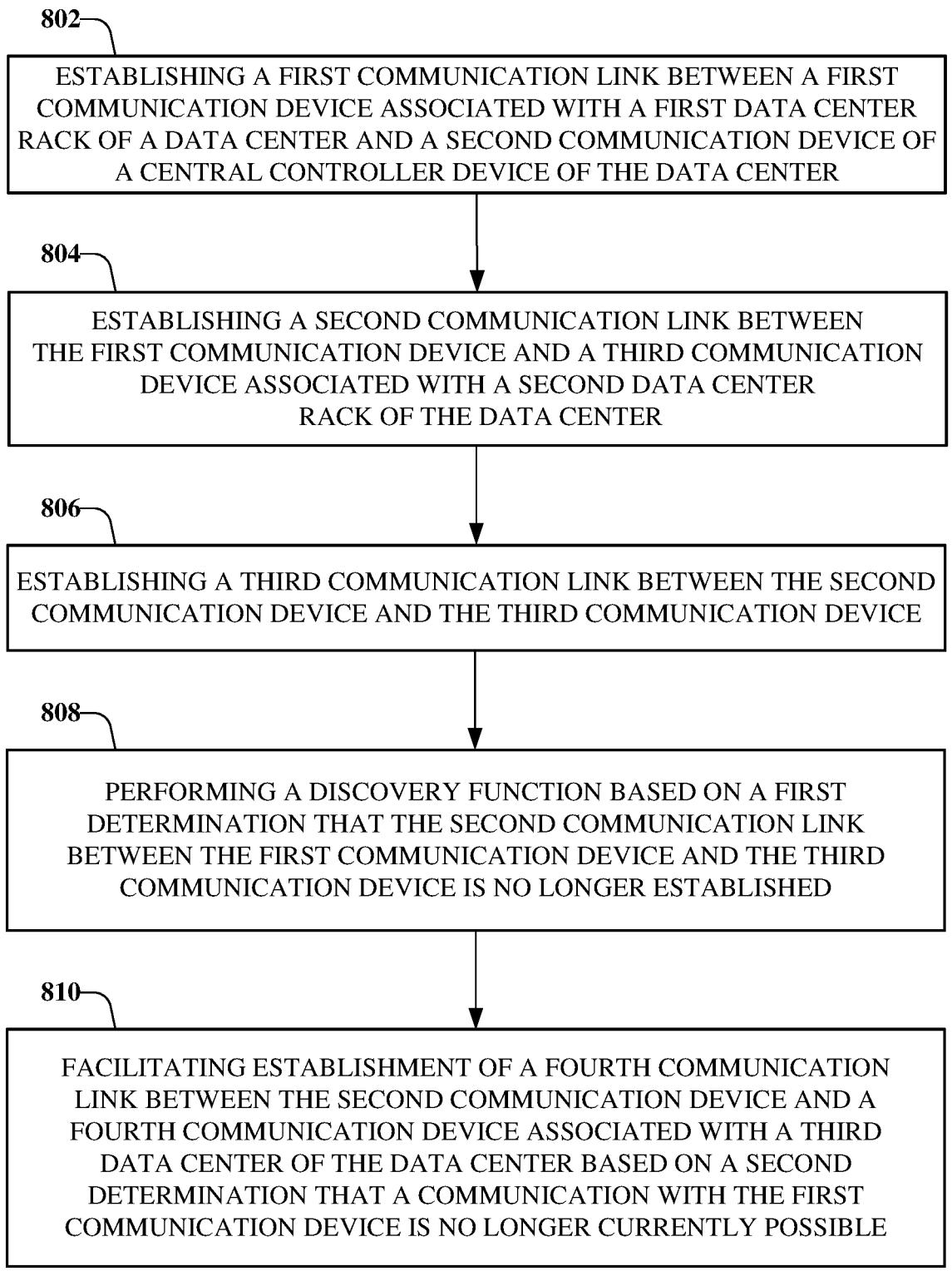
FIG. 8 illustrates an example, non-limiting, method for facilitating device discovery to facilitate machine to machine communication solutions in accordance with one or more embodiments described herein.

FIG. 8 illustrates an example, non-limiting, method 800 for facilitating device discovery to facilitate machine to machine communication solutions in accordance with one or more embodiments described herein. Repetitive description of like elements employed in other embodiments described herein is omitted for sake of brevity.

At 802, a first communication link (e.g., the first communication link 110) between a first communication device (e.g., the first communication device 112) associated with a first data center rack (e.g., the first data center rack 102) of a data center and a second communication device (e.g., the second communication device 114) of a central controller device (e.g., the central controller device 108) of the data center can be established.

A second communication link (e.g., the second communication link 116) between the first communication device and a third communication device (e.g., the third communication device 118) associated with a second data center rack (e.g., the second data center rack 104) of the data center can be established at 804. Further, at 806, a third communication link (e.g., the third communication link 120) can be established between the second communication device and the third communication device.

The method 800 can continue, at 808, when a discovery function can be performed based on a first determination that the second communication link between the first communication device and the third communication device is no longer established (e.g., via the discovery component 502). At 810, a fourth communication link (e.g., the fourth communication link 124) can be established between the second communication device and a fourth communication device (e.g., the Nth communication device 122) associated with a third data center rack (e.g., the Nth data center rack 106) of the data center based on a second determination that a communication with the first communication device is no longer currently possible. The fourth communication device can be configured to communicate using the 5G millimeter wave high speed wireless communication protocol.

Accordingly, as discussed herein, the various aspects can utilize machine to machine multi gigabit rates wireless communication among, for example, central office racks and/or data center racks by leveraging 5G Millimeter wave (mmWave) small cell and SDN control capability to reduce cabling and increase communication flexibility among data center racks equipment. The various aspects can provide more flexible and dynamic rack to rack communication for indoor cloud data centers (including central offices). Self-discovery of new added (e.g., rolled in) racks for autonomous operation can also be facilitated. In addition, a reduction in cabling and extensive operational complexity of I/O can be achieved with the disclosed aspects. Further, efficient communication through multicast capabilities of wireless coordination gains among racks for load balancing and interference mitigation out of band back up platform for high availability and fault tolerance are provided. Also, out of band operational command and control and scheduling of rack services is provided. In addition, the various aspects provide dynamic configuration using a software defined approach (e.g., using an SDN controller). Also provided is reduced power consumption (e.g., through load balancing, through wireless communication wherein a control rack does not need to be always in an activation state). In addition, multiple simultaneous paths for inter-rack as and/or TP-SDN controller links are provided, which can include robust communication links with higher bandwidth.

Described herein are systems, methods, articles of manufacture, and other embodiments or implementations that can facilitate machine to machine communication solutions in a 5G network. Facilitating machine to machine communication solutions in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Further, the term network device (e.g., network node, network node device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

As used herein, "5G" can also be referred to as New Radio (NR) access. Accordingly, systems, methods, and/or machine-readable storage media for facilitating improved communication coverage and/or machine to machine communication solutions for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
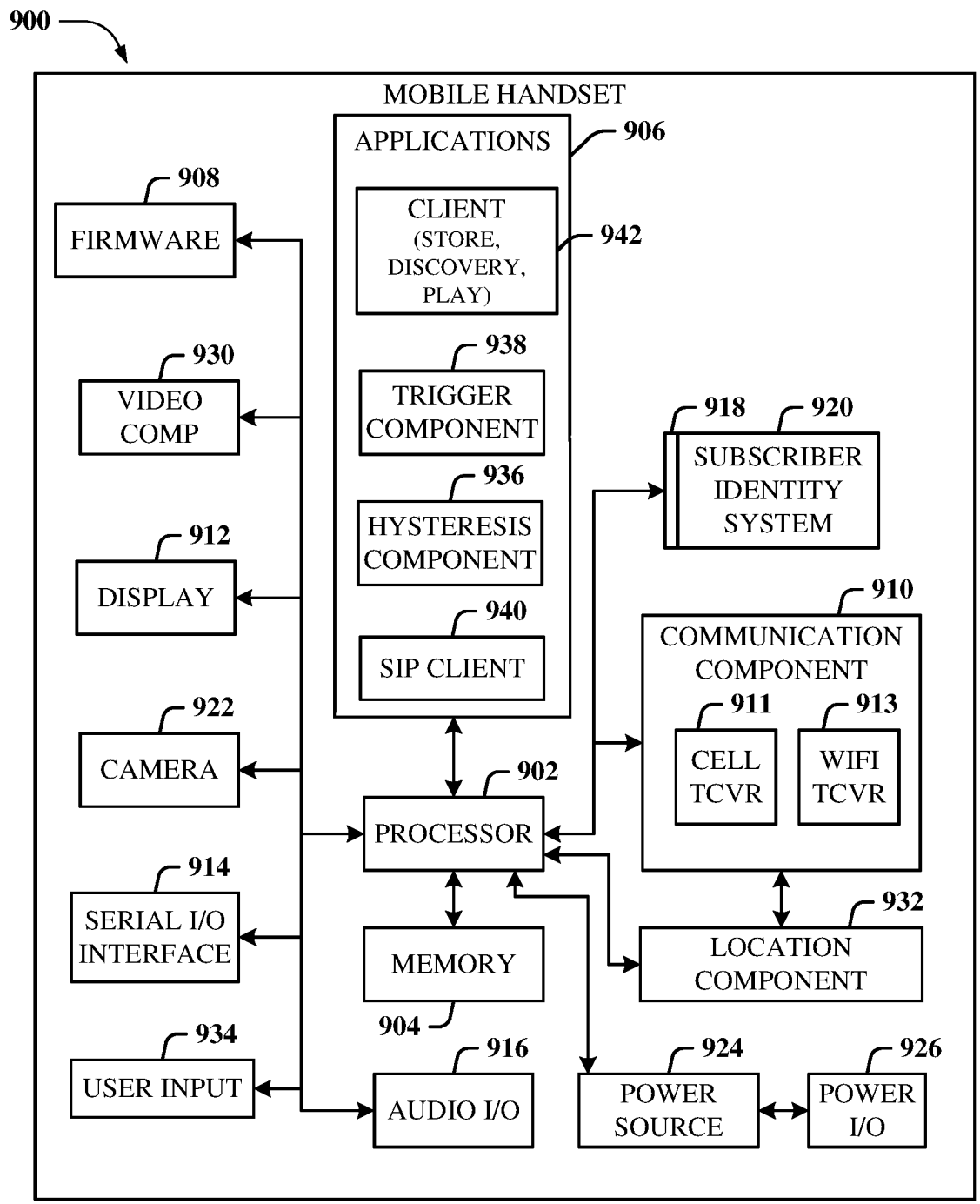
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
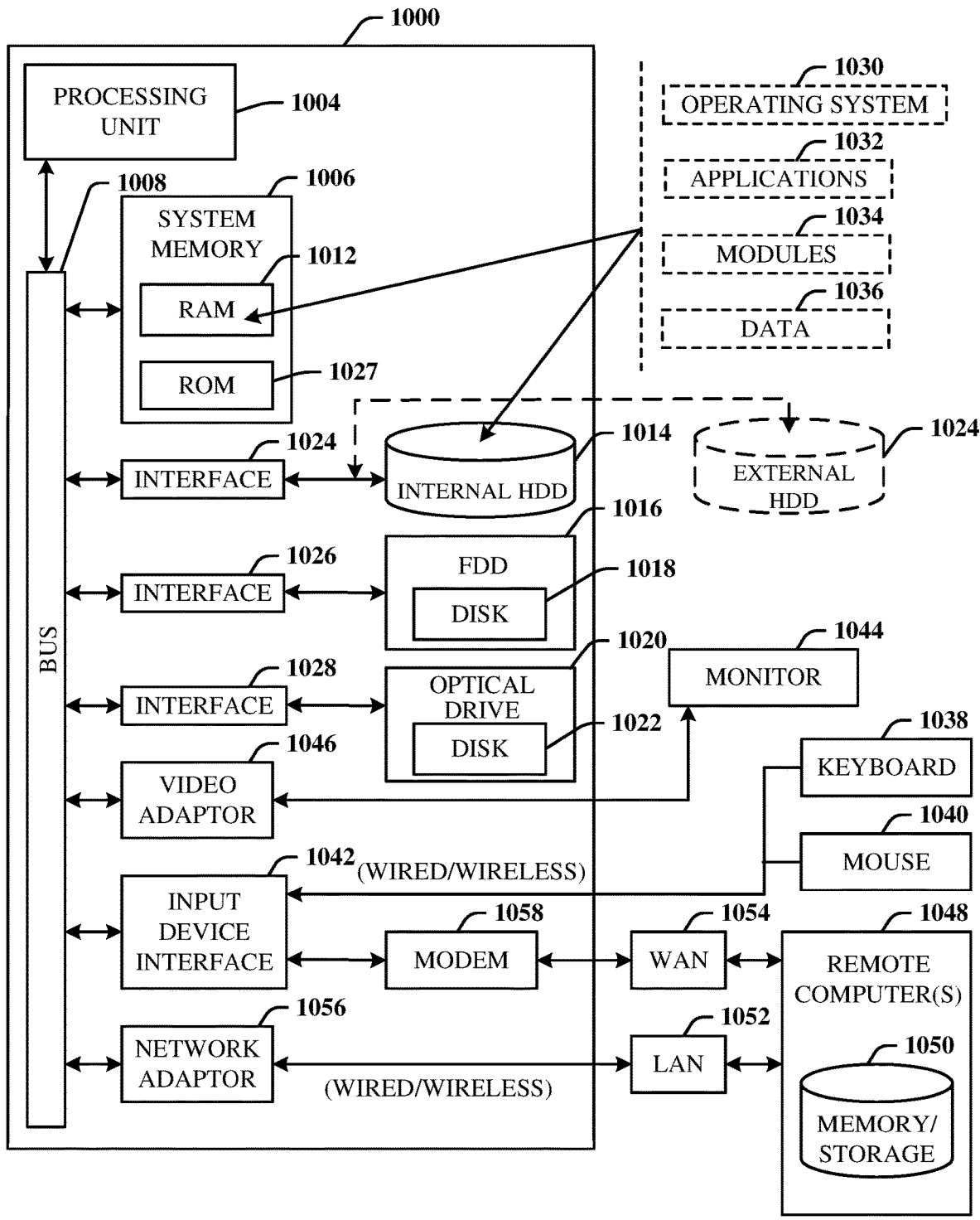
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a machine to machine communication solutions for 5G systems are provided herein. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:

establishing a first communication link between a first communication device associated with a first data center rack of a data center and a second communication device of a central controller device of the data center, wherein the first communication device and the second communication device are configured to communicate using a millimeter wave high speed wireless communication protocol;

establishing a second communication link between the first communication device and a third communication device associated with a second data center rack of the data center, wherein the third communication device is configured to communicate using the millimeter wave high speed wireless communication protocol;

establishing a third communication link between the second communication device and the third communication device; and facilitating an interference mitigation configuration for the first communication device and the third communication device comprising:

determining respective directions in which respective directional antennas associated with the first communication device and the third communication device are to be moved based on the interference mitigation configuration, and sending, to the respective directional antennas, information indicative of the respective directional antennas that facilitates movement of the respective directional antennas associated with the first communication device and the third communication device.

2. The system of claim 1, wherein the first communication device performs a backhaul function that facilitates a first transmission of data via the first communication link.

3. The system of claim 2, wherein the first communication device performs an access function that facilitates a second transmission of data via the second communication link.

4. The system of claim 1, wherein the second communication link comprises a wireless inter-rack communication within the data center.

5. The system of claim 1, wherein the second communication device performs a backhaul function and an access function that enable wireless bidirectional transmit and receive data communication for control and management of the first data center rack and the second data center rack.

6. The system of claim 1, wherein the operations further comprise:
   establishing an inter-rack network that comprises the first data center rack, the second data center rack, and other data center racks of the data center other than the first data center rack and the second data center rack; and
   load balancing network traffic that has been received at the data center to distribute the network traffic uniformly between the first data center rack, the second data center rack, and the other data center racks.

7. The system of claim 1, wherein the millimeter wave high speed wireless communication protocol is a 5G millimeter wave high speed wireless communication protocol, and wherein the operations further comprise:
   performing a discovery function based on a first determination that the second communication link between the first communication device and the third communication device is no longer established; and
   facilitating establishment of a fourth communication link between the second communication device and a fourth communication device associated with a third data center of the data center based on a second determination that a communication with the first communication device is no longer currently possible, wherein the fourth communication device is configured to communicate using the 5G millimeter wave high speed wireless communication protocol.

8. The system of claim 1, wherein the operations further comprise:
in response to a change in a bandwidth distribution, changing a radio resource allocation for an inter-rack communication link between the first data center rack and the second data center rack.

9. The system of claim 8, wherein the operations further comprise:
establishing multiple simultaneous paths for the inter-rack communication link, and wherein the multiple simultaneous paths implement robust communication links and an increased bandwidth as compared to a single inter-rack communication link between the first data center rack and the second data center rack.

10. The system of claim 1, wherein the operations further comprise:
in response to a change in a bandwidth distribution, changing a radio resource allocation for a self-backhauling communication link of a communication channel between the first communication device and the central controller device.

11. The system of claim 10, wherein the operations further comprise:
establishing multiple simultaneous paths for the self-backhauling communication link, and wherein the multiple simultaneous paths implement robust communication links and an increased bandwidth as compared to a single self-backhauling communication link between the first data center rack and the central controller device.

12. The system of claim 1, wherein the first communication device, the second communication device, and the third communication device are implemented within the data center to decrease a number of physical cable connections within the data center.

13. A method, comprising:
facilitating, by a controller device of a wireless network, a first establishment of a first wireless communication link with a first cloud data center rack, wherein the first wireless communication link is established between a first millimeter wave transport device of the controller device and a second millimeter wave transport device of the first cloud data center rack;
facilitating, by the controller device, a second establishment of a second wireless communication link with a second cloud data center rack, wherein the second wireless communication link is established between the first millimeter wave transport device and a third millimeter wave transport device of the second cloud data center rack; and
facilitating, by the controller device, a third establishment of a third wireless communication link between the first cloud data center rack and the second cloud data center rack, wherein the third wireless communication link is established between the second millimeter wave transport device and the third millimeter wave transport device; and
facilitating, by the controller device, movement of respective directional antennas associated with the first cloud data center rack and the second cloud data center rack into an interference mitigation configuration, the facilitating the movement comprising:
determining, by the controller device, respective directions of the movement of the respective directional antennas based on the interference mitigation configuration, and
transmitting, by the controller device to the first cloud data center rack and the second cloud data center rack, information indicative of the respective directions of the movement of the respective directional antennas based on the interference mitigation configuration.

14. The method of claim 13, further comprising:
configuring, by the controller device, respective multiple-input-multiple output and beam-forming configurations for the first wireless communication link, the second wireless communication link, and the third wireless communication link.

15. The method of claim 13, further comprising:
configuring, by the controller device, respective interference mitigation configurations for the first cloud data center rack and the second cloud data center rack.

16. The method of claim 13, further comprising:
re-directing, by the controller device, network traffic from the first cloud data center rack to the second cloud data center rack based on a determination that the network traffic is not distributed evenly between the first cloud data center rack and the second cloud data center rack.

17. The method of claim 13, further comprising:
modifying, by the controller device, a radio resources allocation for an inter-rack communication link between the first cloud data center rack and the second cloud data center rack based on a bandwidth distribution.

18. A machine-readable storage medium, comprising executable instructions that, when executed by a processor, facilitate performance of operations, comprising:
facilitating an inter-rack communication between a first rack device and a second rack device, wherein the first rack device and the second rack device are rack devices of a data center, and wherein the inter-rack communication is established between a first wireless 5G millimeter wave transport device of the first rack device and a second wireless 5G millimeter wave transport device of the second rack device;
establishing a first backhaul link between the first wireless 5G millimeter wave transport device and a third wireless 5G millimeter wave transport device of a central device of the data center; and
establishing a second backhaul link between the second wireless 5G millimeter wave transport device and the third wireless 5G millimeter wave transport device;
based on an interference mitigation configuration for the first rack device and the second rack device, ascertaining respective movement directions for respective directional antennas associated with the first rack device and the second rack device;
conveying information indicative of the respective movement directions to the first rack device and the second rack device that facilitate movement of the respective directional antennas; and
based on the information, configuring respective directional antennas associated with the first rack device and the second rack device into respective interference mitigation positions.

19. The machine-readable storage medium of claim 18, wherein the operations further comprise:

maintaining a load condition data structure that comprises a first load condition for the first rack device and a second load condition for the second rack device, and wherein the first load condition represents a first amount of network traffic processed by the first rack device and the second load condition represents a second amount of network traffic processed by the second rack device; and moving a portion of the first amount of network traffic from the first rack device to the second rack device based on a determination that the first amount of network traffic is larger than the second amount of network traffic by at least a threshold traffic amount.

20. The machine-readable storage medium of claim 18, wherein the operations further comprise:

establishing multiple simultaneous paths for the inter-rack communication between the first rack device and the second rack device, and wherein the multiple simultaneous paths comprise robust communication links and an increased bandwidth as compared to a single inter-rack communication link between the first rack device and the second rack device.

* * * * *